(12) United States Patent
Singh

(10) Patent No.: US 11,344,161 B2
(45) Date of Patent: May 31, 2022

(54) HANDLE FOR A CONTAINER, HAND-TOOL OR OTHER LIKE ITEM

(71) Applicant: SEA TO SUMMIT PTY LTD, Rivervale (AU)

(72) Inventor: Paramjeet Singh, Rivervale (AU)

(73) Assignee: Sea to Summit Pty Ltd, Rivervale (AU)

( * ) Notice: Subject to any disclaimer, the term of this patent is extended or adjusted under 35 U.S.C. 154(b) by 380 days.

(21) Appl. No.: 16/246,479

(22) Filed: Jan. 12, 2019

(65) Prior Publication Data

US 2020/0015631 A1 Jan. 16, 2020

Related U.S. Application Data

(63) Continuation of application No. PCT/AU2017/050597, filed on Jun. 15, 2017.

(30) Foreign Application Priority Data

Jul. 13, 2016 (AU) .................................. 2016902760

(51) Int. Cl.
*A47J 45/07* (2006.01)
*A47J 36/06* (2006.01)

(52) U.S. Cl.
CPC ............. *A47J 45/071* (2013.01); *A47J 36/06* (2013.01)

(58) Field of Classification Search
CPC .......... A47J 45/06; A47J 45/071; A47J 36/06; A47J 36/10; B65D 25/282; B65D 25/2844; B65D 25/28; B65D 25/2841; B65D 25/285; B65D 25/2852; B65D 45/16; B65D 45/20; B65D 2525/288; B65D 2525/285; B65D 2525/286
(Continued)

(56) References Cited

U.S. PATENT DOCUMENTS

| | | | | |
|---|---|---|---|---|
| 66,173 | A | * 6/1867 | Robinson | ............... B65F 1/1615 |
| | | | | 220/212.5 |
| 403,656 | A | * 5/1889 | Tie | ........................ A47J 45/061 |
| | | | | 220/763 |

(Continued)

FOREIGN PATENT DOCUMENTS

| CN | 203493507 U | * 3/2014 |
|---|---|---|
| CN | 203493507 U | 3/2014 |

(Continued)

OTHER PUBLICATIONS

PCT International Search Report and Written Opinion, PCT/AU2017/050597, dated Sep. 27, 2017, 11 pages.

*Primary Examiner* — Chun Hoi Cheung
*Assistant Examiner* — Brijesh V. Patel
(74) *Attorney, Agent, or Firm* — Dascenzo Gates Intellectual Property Law, P.C.

(57) ABSTRACT

A handle for a container, the container including a peripheral wall that defines an internal area. The handle includes a mount having a locking recess and a body including a pivot arm and a locking arm. The pivot arm is pivotally connected to the mount. When positioned in an operating position, the locking arm is biased toward the locking recess so as to secure the locking arm in place relative to the mount. When positioned in a storage position, the body is rotated about the pivot arm to a location above or in the internal area.

28 Claims, 5 Drawing Sheets

(58) Field of Classification Search
USPC ..... 220/94 R, 95–96, 85 CH, 263, 334, 756,
220/759, 762–764, 573.1; 16/114 A,
16/114 R, 112, 324, 326, 328, 331–332,
16/349, 353, 378, 380, 374, DIG. 24;
403/93–94, 97, 325; D7/323, 337,
D7/339–341, 352, 354–358, 360,
D7/362–367, 393, 402–403, 407–411,
D7/601, 605; 99/340, 426, 449;
292/256, 250
See application file for complete search history.

(56) References Cited

U.S. PATENT DOCUMENTS

| | | | | |
|---|---|---|---|---|
| 823,415 A * | 6/1906 | Krampitz | ............... | A47J 45/10 126/275 R |
| 1,355,332 A * | 10/1920 | Hanson | ............... | A47J 45/071 220/763 |
| 1,490,568 A * | 4/1924 | Koenig | ............... | A47J 45/061 220/762 |
| 1,666,012 A * | 4/1928 | Humphrey | ............... | F25D 3/08 220/212.5 |
| 1,765,072 A * | 6/1930 | Hashimoto | ............. | A47J 36/10 220/318 |
| 2,373,917 A * | 4/1945 | Ross | ................... | A47J 41/0083 215/228 |
| 2,384,718 A * | 9/1945 | Witherspoon | ....... | B65D 25/285 220/764 |
| 2,444,447 A * | 7/1948 | Josselyn | ............ | B65D 25/2844 220/763 |
| 2,460,840 A * | 2/1949 | Mockabee | ......... | B65D 25/2844 16/110.1 |
| 3,082,906 A * | 3/1963 | Reed | .................. | B65D 81/3407 220/761 |
| 3,273,747 A * | 9/1966 | Kalz | ....................... | A47J 36/10 220/318 |
| 3,420,401 A * | 1/1969 | Maslow | .............. | A47J 45/071 220/759 |
| 3,610,461 A * | 10/1971 | Allyn | .................... | B65D 25/282 220/212 |
| 3,812,997 A * | 5/1974 | McNally | ................. | A47J 33/00 220/529 |
| D275,643 S * | 9/1984 | Petterson | ................... | A45F 3/16 D7/355 |
| 4,505,390 A * | 3/1985 | Kirk, Jr. | ................. | A45C 11/20 99/339 |
| 4,593,833 A | 6/1986 | Hill | | |
| 4,724,576 A | 2/1988 | Tatematsu | | |
| 5,056,424 A * | 10/1991 | Lai | ....................... | A45C 11/20 99/339 |
| 5,166,485 A * | 11/1992 | Arai | ..................... | A47J 45/061 219/732 |
| 5,213,028 A * | 5/1993 | Chang | ................... | A47J 27/002 126/373.1 |
| 5,823,385 A * | 10/1998 | Cautereels | .......... | B65D 25/282 220/762 |
| 5,904,269 A * | 5/1999 | Wolff | ................. | B65D 25/2852 220/756 |
| 6,116,452 A * | 9/2000 | Hamel | ..................... | A61L 2/26 206/370 |
| 6,173,860 B1 | 1/2001 | Lamers | | |
| 6,220,477 B1 * | 4/2001 | Schneider | ............. | A47J 45/061 220/757 |
| 6,334,386 B1 * | 1/2002 | Iacchetti | ................. | A47J 37/10 99/425 |
| 6,685,048 B1 * | 2/2004 | Ranzoni | ................ | A47J 45/061 220/759 |
| 7,762,182 B2 * | 7/2010 | Garziera | ............... | A47J 45/061 99/425 |
| D662,761 S * | 7/2012 | Wahl | ................... | B65D 25/2841 D7/354 |
| 8,668,111 B2 * | 3/2014 | Orr | ..................... | B65D 25/2841 220/756 |
| 8,950,621 B2 * | 2/2015 | Hinzman | ................ | A47J 45/06 220/573.1 |
| 9,179,795 B1 * | 11/2015 | Lee | ....................... | A47J 45/061 |
| D751,334 S * | 3/2016 | Pan | ................................ | D7/361 |
| D752,913 S * | 4/2016 | Taylor | ................... | A47J 45/067 D7/361 |
| 9,415,901 B2 * | 8/2016 | Beckman | ............... | A47J 45/067 D7/360 |
| 9,492,034 B2 * | 11/2016 | Pan | ...................... | A47J 45/061 |
| D788,518 S * | 6/2017 | Aggarwal | ........... | A47J 37/0623 D7/360 |
| 2009/0183565 A1 * | 7/2009 | Shamoon | ............... | G01F 19/00 73/426 |
| 2011/0247504 A1 * | 10/2011 | Zangrande | .............. | A47J 43/18 99/357 |
| 2015/0053696 A1 * | 2/2015 | Borovicka | ........... | A47J 45/071 220/573.1 |
| 2015/0183536 A1 * | 7/2015 | Miros | .................... | B65D 45/16 53/484 |
| 2018/0125292 A1 * | 5/2018 | Workman | ........... | A47J 37/0623 |

FOREIGN PATENT DOCUMENTS

| | | |
|---|---|---|
| EP | 0247229 B1 | 2/1990 |
| GB | 581555 A | 10/1946 |
| KR | 20000020493 U | 5/2000 |
| KR | 2010135554 A | 12/2010 |

* cited by examiner

HANDLE FOR A CONTAINER, HAND-TOOL OR OTHER LIKE ITEM

FIELD OF THE INVENTION

The invention relates to a handle for a container, hand tool or other like item. The handle is particularly suitable for use with pots that require frequent storage, such as camping pots. However, the handle can be adapted for hand tools or other like items.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

A pot comprises a container and a handle and, possibly, a lid to fit the container. The handle typically extends outwards from the periphery of the container to facilitate ease of use of the pot. This same arrangement, however, causes problems when seeking to store the pot.

One way to solve this problem has been to create removable handles. While removable handles allows for easier storage, the requirement to disassemble and reassemble the pot when moving between storage to the workspace and back again is time consuming. It also leaves the pot open to becoming unusable if the removable handle is lost.

An alternative approach to solving the problem has been to create collapsible handles. An example of a collapsible handle is shown in U.S. Pat. No. 4,724,576 (Nitto Aluminium). The Nitto Aluminium patent comprises a pot where the handle is locked in place during normal use. However, when the user wishes to store the pot, the user depresses the handle, thereby allowing the handle to be rotated to a position over the top of the container. This gives the pot a reduced size for storage, but as it is easy to depress the handle during normal operation it is possible for the handle to inadvertently collapse while in use. If this were to occur when the user was using the pot for heating or boiling this presents a situation where the user may be burnt.

It is therefore an object of the present invention to provide a handle for a container, such as a pot, that can be collapsed for storage while limiting the potential for inadvertent collapsing during use.

Definition of Container

Within the context of this invention, the term "container" is intended to mean anything in which something else can be contained, be it a liquid, solid or gas. Examples of such "containers" include cups, jugs and bowls.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is a handle for a container, the container having a peripheral wall that defines an internal area, the handle comprising:
   a mount having a locking recess;
   a body comprising a pivot arm and a locking arm;
   where the pivot arm is pivotally connected to the mount and, when positioned in an operating position, the locking arm is biased towards the locking recess so as to secure the locking arm in place relative to the mount and, when positioned in a storage position, the body is rotated about the pivot arm to a location above the internal area.

In one variation, the locking arm has a projection extending from one end thereof, the projection having a size and shape complimentary to the locking recess. In a second variation, the mount has at least one retainer flange and the locking recess takes the form of an opening in each of the at least one retainer flange.

With regards to the first variation, the body may further comprise a latch positioned between the pivot arm and the locking arm, the latch operable to bias the locking arm towards the locking recess. The latch preferably has a resilient arm and the locking arm has a cam abutment, the resilient arm operable to bias the locking arm through its contact with the cam abutment.

In this manner, the bias acts to ensues that the locking arm remains in the operating position during normal use.

Ideally, at least an activating end of the locking arm is recessed within the body when the body is in the operating position.

With regards to the second variation, the locking arm may have an enlarged portion, the enlarged portion operable to facilitate appropriate positioning of the locking arm in the at least one opening. Additionally, the mount may have a flat spring attached thereto, the flat spring biased towards a position where it obstructs removal of the locking arm from the at least one opening.

In additional arrangements of the second variation, the pivot arm has a locking mechanism connected thereto, the locking mechanism operable to rotate about the pivot body and connect to the locking arm in a manner that sets a fixed distance between the pivot arm and the locking arm. The locking mechanism may also incorporate a cut out portion, the cut out portion being of substantially the same shape and size as the portion of the locking arm to which it can be releasably retained.

In accordance with a second aspect of the invention there is a container comprising:
   a peripheral wall defining an internal area;
   a handle according to the first aspect of the invention;
   a lid having a lid handle, the lid having a shape matching the internal area,
the lid handle having an aperture for receiving a free end of the handle body when the handle is in its storage position. In a further arrangement, the aperture may include a retaining projection, the retaining projection operable to prevent inadvertent removal of the free handle when received in the aperture.

In a variation of this second aspect, the lid may have a deformable grip in place of the lid handle, the deformable grip operable to deform to receive a free end of the handle body when the handle is in its storage position.

In accordance with a third aspect of the invention there is a a pivot handle comprising:
   a mount having a locking recess;
   a body comprising a pivot arm and a locking arm;
      where the pivot arm is pivotally connected to the mount and, when positioned in an operating position, the locking arm is biased towards the locking recess so as to secure the locking arm in place relative to the mount and, when positioned in a storage position, the body is rotated about the pivot arm to a location above or interior to an object to which the pivot handle is mounted by way of the mount.

A preferred use of such a pivot handle arises where the mount is mounted to an operational portion of a hand tool, such that when positioned in its storage position, the body is rotated about pivot arm to a location above the operational portion of the hand tool.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
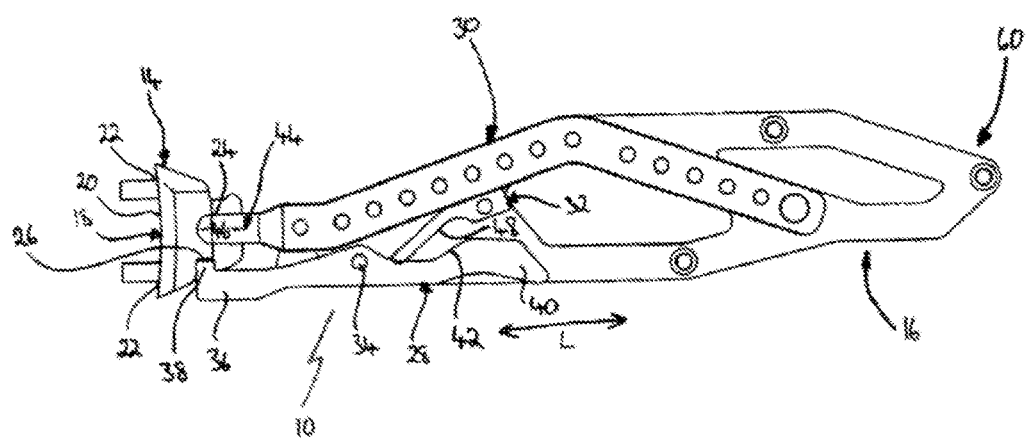
FIG. 1 is a top plan view of a handle for a pot in accordance with a first embodiment of the invention with covering portions removed for clarity.
Figure 2:
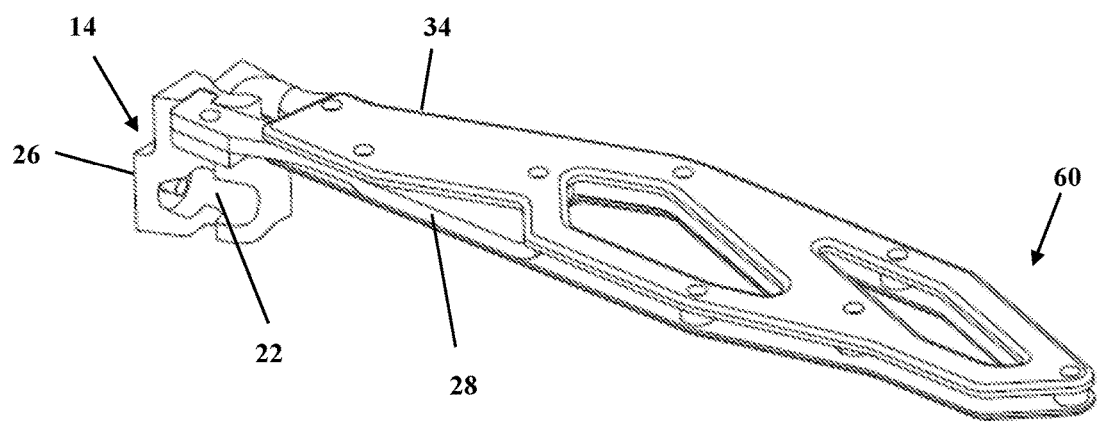
FIG. 2 is a side plan view of the handle as shown in FIG. 1.
Figure 3:
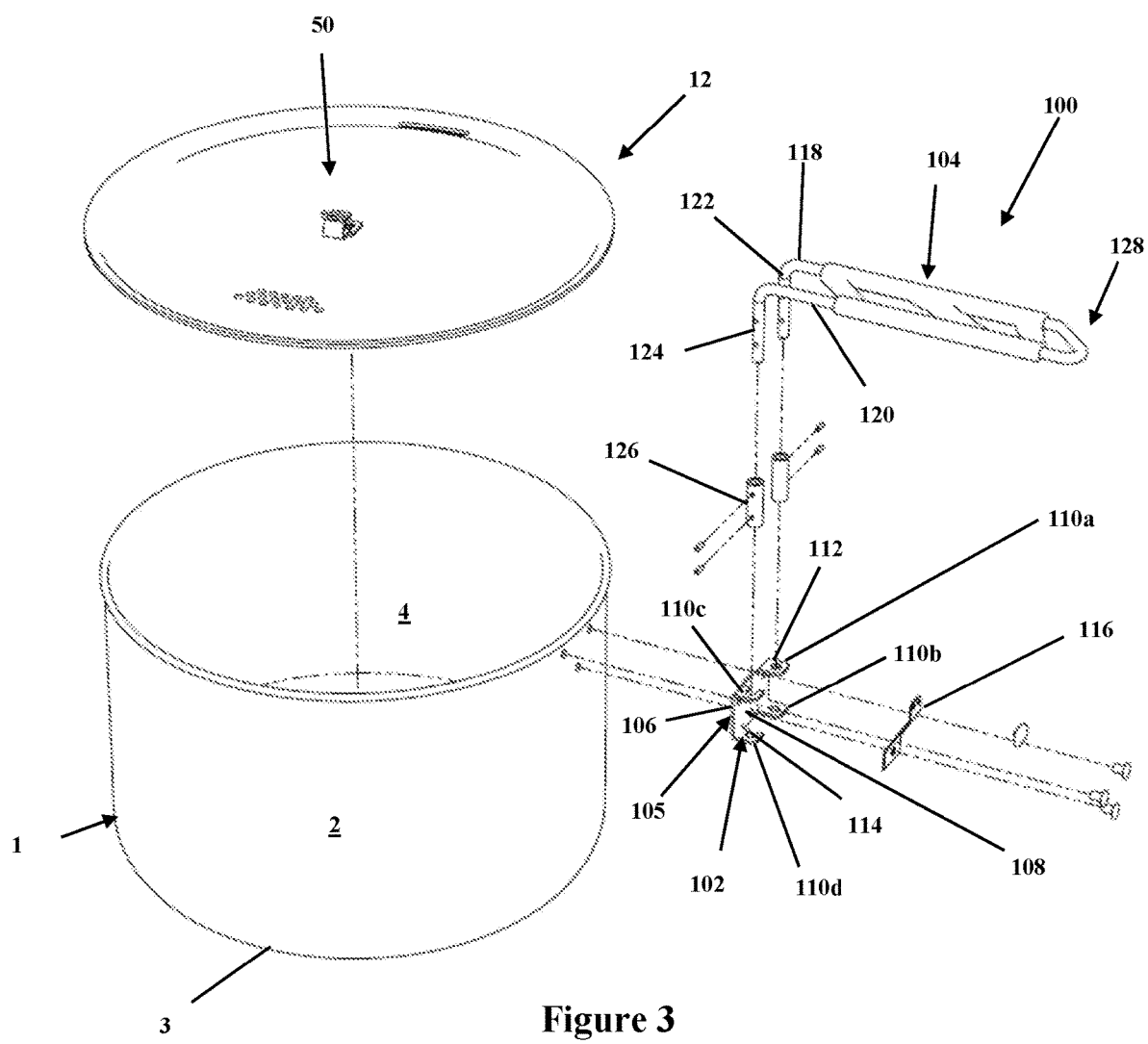
FIG. 3 is an exploded view of a handle for a pot in accordance with a second embodiment of the invention.
Figure 4A:
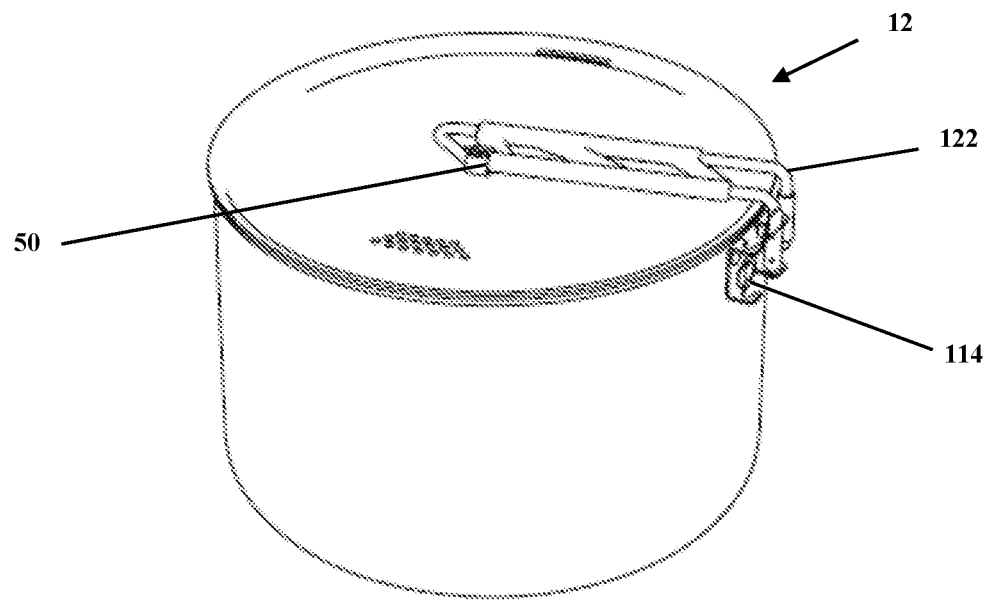
FIGS. 4*a* and 4*b* are assembled view of the handle as shown in FIG. 3 in its stored and operational positions.
Figure 4B:
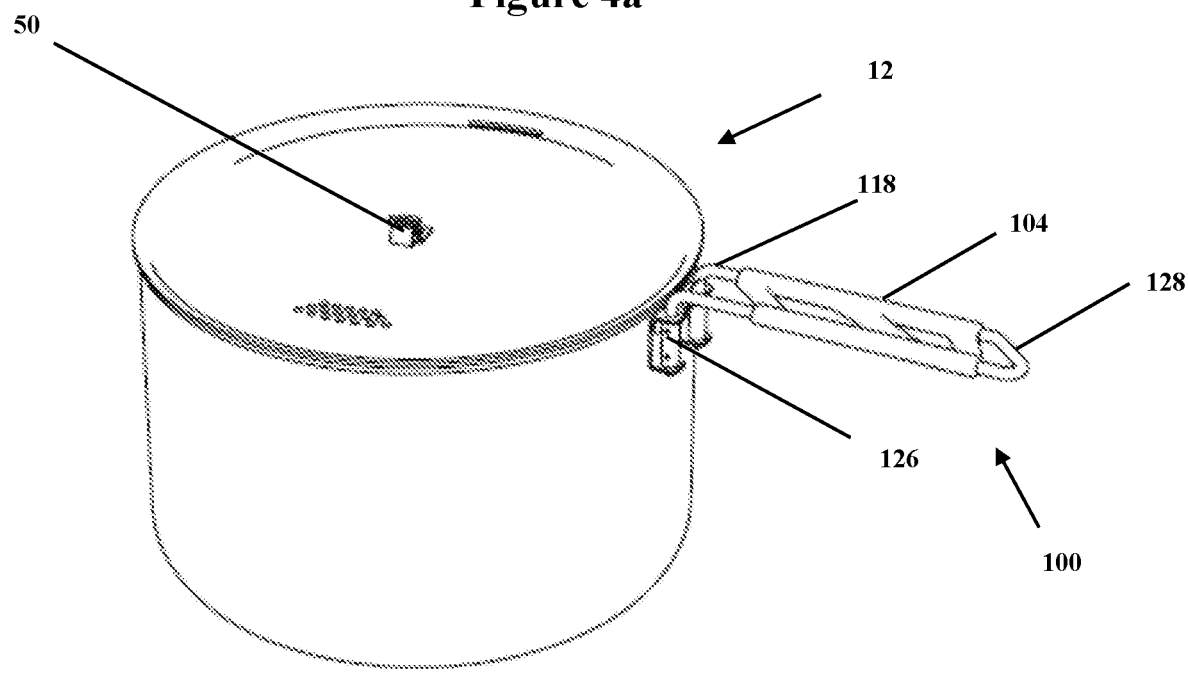
Figure 5:
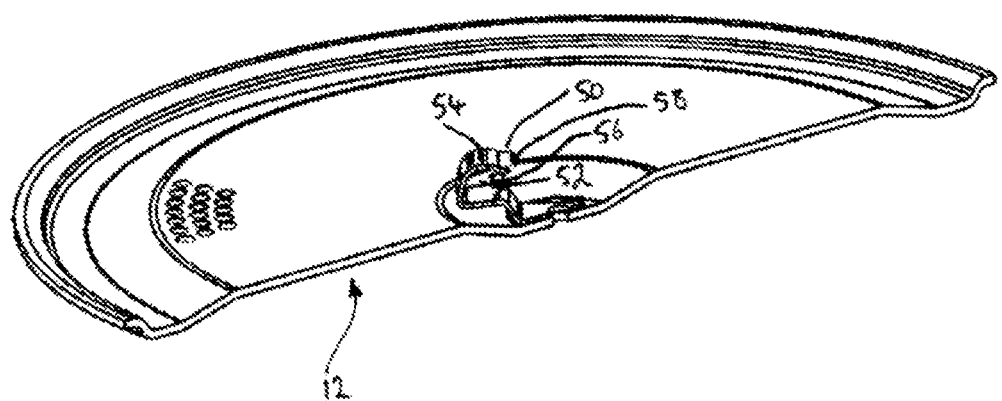
FIG. 5 is a cross-sectional view of a first lid as used with the handles as shown in FIGS. 1 to 4.
Figure 6:
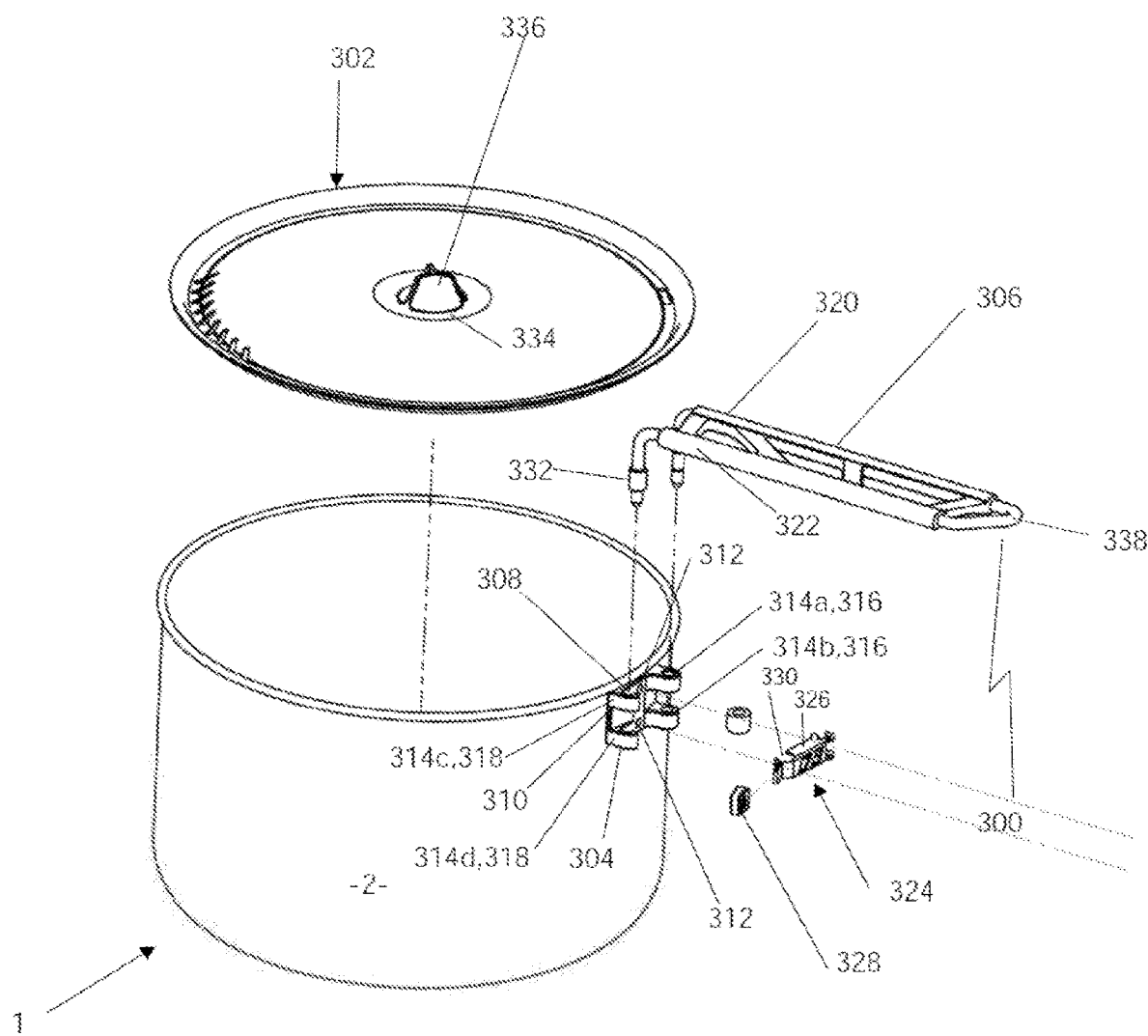
FIG. 6 is a cross-sectional view of a second lid as used with the handles as shown in FIGS. 1 to 6

In accordance with a first embodiment of the invention there is a handle 10 for a container 1.

The container 1 has a peripheral wall 2 that surrounds a base 3. The base 3 and the peripheral wall 2 define an internal area 4. When properly placed relative to the peripheral wall 2, a lid 12 operates to seal the internal area 4.

The handle 10 comprises a mount 14 and a body 16.

The mount 14 has a connecting body 18. A first surface 20 of the connecting body 18 has a complimentary shape to a portion of the peripheral wall 2. The connecting body 18 also has lateral fastening apertures 22. The fastening apertures 22 are adapted to receive fasteners (not shown) which permanently affix the mount 14 to the peripheral wall 2.

The connecting body 18 also has a pivot aperture 24. The pivot aperture 24 is located between the fastening apertures 22. The pivot aperture 24 extends through the connecting body 18.

Located to one side of the pivot aperture 24 is a lug recess 26. The lug recess 26 will be explained in more detail below.

The body 16 has a locking arm 28, a pivot arm 30 and a latch 32.

The locking arm 28 has a pivot point 34 located midway along its length (L). At a first end 36 of the locking arm 28 is a lug 38. The lug 38 is of a shape that matches the shape of the lug recess 26.

Opposing end 40 of the locking arm 28 has a greater width than first end 36. A portion of the opposing end 40 near the pivot point 34 is shaped so as to define a cam abutment 42.

The locking arm 28 is attached to the body 16 at the pivot point 34. The point of attachment between body 16 and pivot point 34 is such that, when the handle 10 is in an operational position, the lug 38 is capable of being securely received within the lug recess 26.

The pivot arm 30 is shaped so as to provide structural integrity to the body 16. Located at an end 44, being the end correlating with first end 36 of locking arm 28, is a pivot rod 46 that extends perpendicular to the remainder of the pivot arm 30. The pivot rod 46 is of size and dimension so as to be securely received within the pivot aperture 24. When so received, the pivot rod 46 can not be removed from the pivot aperture 24, but is able to rotate therein.

Sandwiched between the pivot arm 30 and the locking arm 28 is the latch 32. The latch 32 has a resilient arm 48. The latch 32 is permanently fixed to the body 16 at a position such that the resilient arm 48 makes contact with the cam abutment 42.

The lid 12 has a lid handle 50 projecting centrally therefrom. The lid handle 50 comprises a handle retaining portion 52 and a grip 54. The grip 54 sits above the handle retaining portion 52.

The handle retaining portion 52 is shaped substantially similar to a "C" and in doing so forms an opening 56. Located adjacent the opening 56, in the section of the handle retaining portion 52 that sits below the grip 54, is a retaining projection 58. The retaining projection 58 will be explained in more detail below.

This first embodiment of the invention will now be described in the context of its intended use.

A container 1 is placed on a surface (not shown) where it is configured in its stored position. In its stored position, the handle 10 is pivoted about pivot rod 46 (as received within pivot aperture 24) such that it extends over the lid 12. More specifically, the handle 10 extends over the lid 12 such that a second end 60 of the body 16 is received within the handle retaining portion 52. The retaining projection 58 prevents the second end 60 from unintentionally leaving the handle retaining portion 52.

A user (not shown) depresses the second end 60 to a point just below the retaining projection 58. With the second end 60 now at a position where it is free of the handle retaining portion 52, the body 16 can now be rotated about the pivot rod 46 so as to break the connection between the body 16 and the lid 12.

It is to be noted here that the resilient arm 48 operates to bias the locking arm 28 to a closed position through its contact with the cam abutment 42. Thus, throughout this movement the locking arm 48 is generally retained within the body 16 unless a force is applied to the lug 38 which counteracts this bias (such as the lug 38 making contact with the peripheral wall 2).

With the body 16 free of the lid 12, the body 16 is rotated about the pivot rod 46 approximately 180° to its operational position. This rotation continues until the body 16 eventually reaches a position where the lug 38 is received within the lug recess 26. Reception of the lug 38 within the lug recess 26 operates to secure the body 16 in its operational position.

It also operates to prevent over-rotation of the body 16.

The user is then free to use the container 1 in accordance with usual practice.

When the user is finished with the container 1, the user applies force to the opposing end 40 of the locking arm 28 in the direction of the pivot arm 34. This application of force causes the cam abutment 42 to transfer this force to the resilient arm 48. This in turn results in the deformation of the resilient arm 48. At the same time, due to the position at which force is applied, the locking arm 28 is rotated counter-clockwise. This counter-clockwise rotation of the locking arm causes the lug 38 to disengage the lug recess 26.

Once the user ceases applying force to the opposing end 40, the resilient arm 48 is able to return to its original, unbiased position. By reason of its connection to the cam abutment 42, this results in the locking arm 28 being rotated clockwise until such time as the locking arm 28 is again received within the body 16.

With the lug 38 disengaged from the lug recess 26, the body 16 can now be rotated about the pivot rod 46 to a position over the top of the lid 12. More specifically, the body 16 is rotated until such time as second end 60 makes contact with the retaining projection 58. Due to the shape of the retaining projection 58 the body 16 is directed downwards as the body 16 continues to rotate. Just as the body 16 is to enter the handle retaining portion 52, the body 16 clears the retaining projection 58. The retaining projection 58 then snaps back into place, operating as a barrier to inadvertent removal of the body 16 from the handle retaining portion 52. The handle 10 is then considered to be in its stored position.

In this stored position, it is to be noted that not only is physical size of the container 1 decreased, but the handle 10 also operates to secure the lid 12 to the container 1.

In accordance with a second embodiment of the invention, where like numerals reference like parts, there is a handle 100 for a container 1. The container 1 is operable to be used with a lid 12, both being as described in the first embodiment of the invention.

The handle 100 again comprises a mount 102 and a body 104.

The mount 102 has a connecting body 105. The first surface 106 of the connecting body 105 has a complimentary shape to a portion of the peripheral wall 2. The connecting body 105 also has a pair of fastening apertures 108. The fastening apertures 108 are adapted to receive fasteners (not shown) which permanently affix the mount 102 to the peripheral wall 2.

The connecting body 105 also has four retainer flanges 110. Retainer flanges 110a and 110b each have a circular aperture 112 provided therein. Retainer flanges 110c and 110d each have an opening 114 provided therein. The role of openings 114 will be described in more detail below.

Positioned substantially centrally relative to each retainer flanges 110 is a flat spring 116. The flat spring 116 is connected to the mount 102, but able to move freely relative thereto.

The body 104 has a pivot arm 118 and a locking arm 120. Both the pivot arm 118 and the locking arm 120 are "L" shaped.

Shorter arm 122 of the pivot arm 118 is of size and shape to be securely received within the circular apertures 112 of retainer flanges 110a and 110b. When so received, the shorter arm 122 can not be removed from these circular apertures 112, but is able to rotate therein.

Shorter arm 124 of the locking arm 120 is of size and shape to pass through, and be received in, opening 114 of retainer flanges 110c and 110d. Shorter arm 124 also has an enlarged portion 126. The enlarged portion 126 has a size equal to the distance between retainer flanges 110c and 110d. In this manner, the enlarged portion 126 operates to ensure the correct positioning of the shorter arm 124 in addition to preventing retainer flanges 110c and 110d bending towards each other during use.

This second embodiment of the invention will now be described in the context of its intended use.

A container 2 is placed on a surface (not shown) where it is configured in its stored position. In its stored position, the handle 100 is pivoted about shorter arm 122 (as received within retainer flanges 110a and 110b) such that it extends over the lid 12. More specifically, the handle 100 extends over the lid 12 such that a free end 128 of the body 104 is received within the handle retaining portion 52. The retaining projection 58 prevents the free end 128 from unintentionally leaving the handle retaining portion 52.

A user (not shown) depresses the free end 128 to a point just below the retaining projection 58. With the free end 128 now at a position where it is free of the handle retaining portion 52, the body 104 can now be rotated about the shorter arm 122 so as to break the connection between the body 104 and the lid 12.

With the body 104 free of the lid 12, the body 104 is rotated about the shorter arm 122 approximately 180° to its operational position. At this position, the user then squeezes the locking arm 120 towards the pivot arm 118 while at the same time depressing the flat spring 116 so as to overcome its bias towards openings 114.

With the flat spring 116 no longer blocking the openings 114, the shorter arm 124 of the locking arm 120 can be manipulated to a position adjacent openings 114. In this position, when this squeezing force is removed, the locking arm 120 returns to its original position which results in the shorter arm 124 entering openings 114. The bias of the locking arm 120 relative to the pivot arm 118 thereafter acts to ensure that the shorter arm 124 is retained within retainer flanges 110c and 110d in the absence of a further squeezing force.

To prevent a squeezing force from unintentionally unlocking the locking arm 120 from retainer flanges 110c and 110d, once the shorter arm 124 is appropriately positioned, the bias of the flat spring 116 returns it to its normal position blocking the openings 114. In doing so, if the locking arm 120 is inadvertently the subject of a squeezing force, the locking arm 120 can only move within the openings 114 to the point where it is stopped by the flat spring 116.

The user is then free to use the container 1 in accordance with usual practice.

When the user is finished with the container 1, the user again depresses the flat spring 116 which causes it to overcomes its bias and move to a position where it no longer blocks openings 114. The user can then apply a squeezing force to the locking arm 120 such that the locking arm 120 moves free of retainer flanges 110c and 110d. To ensure that the locking arm 120 does not re-enter retainer flanges 110c and 110d when the squeezing force is removed, the user then further manipulates the locking arm 120 to a position away from openings 114.

The user is then free to rotate the body 104 in a counter-clockwise direction such that the body 104 is rotated about the shorter arm 122 to a position over the top of the lid 12. More specifically, the body 104 is rotated until such time as free end 128 makes contact with the retaining projection 58. Due to the shape of the retaining projection 58 the free end 128 is directed downwards as the body 104 continues to rotate. Just as the free end 128 is to enter the handle retaining portion 52, the free end 128 clears the retaining projection 58. The retaining projection 58 then snaps back into place, operating as a barrier to inadvertent removal of the free end 128 from the handle retaining portion 52. The handle 10 is then considered to be in its stored position.

In this stored position, it is to be again noted that not only is physical size of the container 1 decreased, but the handle 100 also operates to secure the lid 12 to the container 1.

In accordance with a third embodiment of the invention, where like numerals reference like parts, there is a handle 300 for a container 1. The container 1 is operable to be used with a lid 302. The container 1 is as described in the first embodiment of the invention.

The handle 300 again comprises a mount 304 and a body 306.

The mount 304 has a connecting body 308. The first surface 310 of the connecting body 308 has a complimentary shape to a portion of the peripheral wall 2. The connecting body 308 also has a pair of fastening apertures 312. The fastening apertures 312 are adapted to receive fasteners (not shown) which permanently affix the mount 304 to the peripheral wall 2.

The connecting body 308 also has four retainer flanges 314. Retainer flanges 314a and 314b each have a circular aperture 316 provided therein. Retainer flanges 314c and 314d each have an opening 318 provided therein. The role of openings 318 will be described in more detail below.

The body 306 has a pivot arm 320 and a locking arm 322. Both the pivot arm 320 and the locking arm 322 are "L" shaped.

The pivot arm 320 is of size and shape to be securely received within the circular apertures 316 of retainer flanges 314a and 314b. When so received, the pivot arm 320 can not be removed from these circular apertures 314, but is able to rotate therein.

Connected to the pivot arm 320 is a locking mechanism 324. When the pivot arm 320 is received within the circular apertures 316, the locking mechanism 324 spans the distance between retainer flanges 314a and 314b.

The locking mechanism 324 comprises a spanning body 326 and a catch 328. The spanning body 326 has a cut-out portion 330. The cut-out portion 330 is sized and shaped to accommodate secure receipt of a portion of the locking arm 322 as described in more detail below. The catch 328 extends away from the spanning body 326 from a position close to the cut-out portion 330.

The spanning body 326 is free to rotate about the pivot arm 320.

Locking arm 322 is of size and shape to pass through, and be received in, opening 318 of retainer flanges 314c and 314d. Locking arm 322 also has an enlarged portion 332. The enlarged portion 332 has a size equal to the distance between retainer flanges 314c and 314d. In this manner, the enlarged portion 332 operates to ensure the correct positioning of the locking arm 322 in addition to preventing retainer flanges 314c and 314d bending towards each other during use.

The lid 302 has a grip 334 projecting centrally therefrom. The grip 334 comprises a plurality of grip walls 336 that are connected at one end to each other at a point substantially central of the lid 302. Each grip wall 336 is equally angled form its adjacent walls. In this embodiment, this means there is an angle of substantially 120° between each grip wall 336.

The grip 334 is made from a flexible material, so as to allow deformation of the grip walls 336 when receiving the handle 300 as described further below.

This third embodiment of the invention will now be described in the context of its intended use.

A container 2 is placed on a surface (not shown) where it is configured in its stored position. In its stored position, the handle 300 is pivoted about pivot arm 320 (as received within retainer flanges 314a and 314b) such that it extends over the lid 302. More specifically, the handle 300 extends over the lid 302 such that a free end 338 of the body 306 receives the grip 334. While the grip 334 is made from a flexible material, the resilience of this material is such that a substantive level of force needs to be applied to deform the grip 334 and thereby allow the free end 338 to be free to rotate about the pivot arm 320 so as to break the connection between the body 306 and the lid 302.

With the body 306 free of the lid 302, the body 306 is rotated about the pivot arm 320 approximately 180° to its operational position. At this position, the user then squeezes the locking arm 322 towards the pivot arm 320 so as to overcome its bias towards its operable shape.

The pivot arm 320 and the locking arm 322 can be manipulated to a position adjacent openings 318. In this position, when this squeezing force is removed, the locking arm 322 returns to its original position which results in it entering openings 318. The bias of the locking arm 322 relative to the pivot arm 320 thereafter acts to ensure that the locking arm 322 is retained within retainer flanges 314c and 314d in the absence of a further squeezing force.

Once the locking arm 322 is retained within retainer flanges 314c and 314d, the locking mechanism 324 is used to further ensure that it remains in this position. To elaborate, the spanning body 326 is rotated about the pivot arm 320. Rotation continues until the cut-out portion 330 is in substantial alignment with part of the locking arm 322. At this point, further rotation of the spanning body 326 cannot be achieved without the application of force. Furthermore, when such force is applied, the cut-out portion 330 slips around the part of the locking arm 322 that it makes contact with and thereby locks it in place.

The user is then free to use the container 1 in accordance with usual practice.

When the user is finished with the container 1, the user applies force to the spanning body 326 in a direction away from the body of the container 2 by way of the catch 328. This force causes the cut-out portion 330 to deform and no longer contain the locking arm 322. The spanning body 326 is also then free to rotate about the pivot arm 320.

The user can then apply a squeezing force to the locking arm 120 such that the locking arm 322 moves free of retainer flanges 314c and 314d. To ensure that the locking arm 322 does not re-enter retainer flanges 314c and 314d when the squeezing force is removed, the user then further manipulates the locking arm 322 to a position away from openings 314.

The user is then free to rotate the body 306 in a counter-clockwise direction such that the body 306 is rotated about the pivot arm 320 to a position over the top of the lid 302. More specifically, the body 306 is rotated until such time as its free end 338 makes contact with the grip 334.

At this point, in order to secure the free end to the grip 334, additional force is applied to the free end 338 in the direction of the grip 334. This additional force causes the grip 334 to temporarily deform and allow part of the body 306 to pass over it. Due to the hollow nature of the body 306 at the free end 338, on this first part of the body 306 passes over the grip 334 the grip 334 returns to its original shape. In doing so, the free end 338 is then contained in place by the grip 334.

In this stored position, it is to be again noted that not only is physical size of the container 1 decreased, but the handle 300 also operates to secure the lid 302 to the container 1.

While each of the aforementioned embodiments of the invention have been described in the context of a container with a lid, it should be appreciated that the invention is not so limited. In fact, the invention can easily be modified to be used as a foldable handle for hand tools or other like products. In such situations, the handle can be used to fold over the body of the product or, in the case of a hand tool, the operational portion (i.e. the tines, blade portion of a trowel, etc.).

Similarly, it should be appreciated that the lid and handle combinations described can be interchanged. For instance, handle 300 could be used with lid 102 in another configuration while handle 100 could be used with lid 302 in yet a further configuration. The person skilled in the art should recognise that minor modifications may be needed to make these configurations work at a practical level, but such modifications would be readily apparent.

In a variation of the third embodiment, the handle 300 further incorporates a spring 340. The spring 340 is attached to the connecting body 308 at a position where the spring 340 is encapsulated by the spanning body 326 when the locking mechanism 324 is in its locked position. By placing the spring 340 in this position, the spring 340 provides resistance to the locking mechanism 324 entering its locked position, while at the same time forcing the locking mechanism 324 away from the locking arm 322 and when being released from the locking position.

It should be appreciated by the person skilled in the art that the above invention is not limited to the embodiments described. In particular, the following modifications and improvements may be made without departing from the scope of the present invention:

The handle 10, 100 may be used independently of the lid 12 resulting in the body 16, 104 moving to a position above the internal area 4 when in its storage position. In this manner, other containers that do not require lids can incorporate this invention.

Any fastener may be used to fasten the mount 14 to the peripheral wall 2. However, screws are considered the optimal method for such fastening.

Ideally, the body 16 acts as a cover for the locking arm 28, such that when under normal conditions, the locking arm 28 is biased to a position that is recessed within the body 16.

While the description of the invention has been made in the context of an axis of rotation of the handle 10 being in the same horizontal plane as the lid 12, this is not necessary. In fact, the invention can be configured such that the free end 60, 128 may be at a higher position relative to the mount 14, 102 when in its stored position and at a lower position relative to the mount 14, 102 when in its operational position.

The invention may be modified such that the body 16, 104 pivots in a plane perpendicular to the container rather than in a plane parallel thereto.

It should be further appreciated by the person skilled in the art that the invention is not limited to the embodiments described above. Additions or modifications described, where not mutually exclusive, can be combined to form yet further embodiments that are considered to be within the scope of the present invention.

I claim:

1. A container, comprising:
a base;
a peripheral wall surrounding the base; wherein the peripheral wall and the base define an internal area; and
a pivot handle, comprising:
a mount having a connecting body attached to the peripheral wall of the container;
a handle body extending from the mount and selectively positioned relative to the peripheral wall between an operating position, in which the handle body extends away from the internal area, and a storage position, in which the handle body is rotated relative to the operating position and at least a portion of the handle body extends above the internal area, wherein the handle body is configured to rotate within a plane that is parallel to the base as the handle body rotates between the operating position and the storage position, and wherein the handle body remains pivotally coupled to the mount as the handle body rotates between the operating position and the storage position;
a lid configured to cover the internal area; wherein when the lid is seated upon the peripheral wall of the container and the handle body is in the storage position, the lid is positioned between the internal area and the portion of the handle body that extends above the internal area; and
wherein the lid includes a grip that is configured to receive the portion of the handle body when the handle body is in the storage position.

2. The container of claim 1, wherein the handle body is configured to rotate 180 degrees between the operating position and the storage position.

3. The container of claim 1, wherein the pivot handle further comprises a locking mechanism configured to secure the handle body in the operating position and to resist rotation of the handle body away from the operating position.

4. The container of claim 1, wherein when the handle body is in the storage position, the handle body retains the lid on the peripheral wall of the container.

5. The container of claim 1, wherein the grip resiliently deforms to receive the portion of the handle body when the handle body is in the storage position.

6. The container of claim 1, wherein the handle body comprises a locking arm and a pivot arm; wherein the pivot arm is pivotally connected to the mount; wherein when the handle body is positioned in the operating position, the locking arm is secured in place relative to the mount; and wherein when the handle body is positioned in the storage position, the locking arm is disengaged from the mount.

7. The container of claim 1, wherein the grip is formed from a flexible material.

8. A container, comprising:
a base;
a peripheral wall surrounding the base; wherein the peripheral wall and the base define an internal area; and
a pivot handle, comprising:
a mount having a connecting body attached to the peripheral wall of the container; and
a handle body extending from the mount and selectively positioned relative to the peripheral wall between an operating position, in which the handle body extends away from the internal area, and a storage position, in which the handle body is rotated relative to the operating position and at least a portion of the handle body extends above the internal area; wherein the handle body comprises a locking arm and a pivot arm; wherein the pivot arm is pivotally connected to the mount; wherein when the handle body is positioned in the operating position, the locking arm is secured in place relative to the mount, and wherein when the handle body is positioned in the storage position, the locking arm is disengaged from the mount.

9. The container of claim 8, wherein the pivot arm and the locking arm extend-parallel to each other when the handle body is in the operating position.

10. The container of claim 8, wherein the locking arm is biased away from the pivot arm.

11. The container of claim 8, wherein the mount includes a plurality of retainer flanges; wherein the plurality of retainer flanges includes a first subset of retainer flanges to which the pivot arm is pivotally connected; and wherein the plurality of retainer flanges further includes a second subset of retainer flanges within which the locking arm is received when the handle body is in the operating position.

12. The container of claim 11, wherein the second subset of the retainer flanges includes locking recesses in the form of openings into which the locking arm is received when the handle body is in the operating position.

13. The container of claim 11, wherein the handle body further comprises a latch positioned between the pivot arm and the locking arm; and further wherein the latch is operable to bias the locking arm towards the second subset of retainer flanges.

14. The container of claim 13, wherein the latch has a resilient arm and the locking arm has a cam aperture; and further wherein the resilient arm is operable to bias the locking arm through contact with the cam aperture.

15. The container of claim 13, wherein the latch is attached to the pivot arm; and further wherein the latch is operable to pivot about the pivot arm toward openings in the second subset of retainer flanges to secure the locking arm within the openings.

16. The container of claim 11, wherein the handle body further comprises a locking mechanism configured to secure the handle body in the operating position and to resist rotation of the handle body away from the operating position.

17. The container of claim 16, wherein the locking mechanism is connected to the pivot arm and configured to rotate about the pivot arm to selectively engage the locking arm to retain the handle body in the operating position.

18. The container of claim 17, wherein the locking mechanism includes a spanning body sized to extend between the first subset of retainer flanges and the second subset of retainer flanges; and further wherein the locking mechanism includes a cut-out portion configured to receive a portion of the locking arm to maintain the locking arm within the second subset of retainer flanges when the handle body is in the operating position.

19. The container of claim 18, wherein the spanning body is configured to set a fixed distance between the pivot arm and the locking arm when the handle body is in the operating position.

20. The container of claim 18, wherein the locking mechanism further includes a catch extending away from the spanning body and configured urge the spanning body away from the locking arm when the handle body is in the operating position.

21. The container of claim 16, wherein the pivot handle further includes a spring configured to bias the locking mechanism away from the locking arm.

22. The container of claim 16, wherein the pivot handle further includes a spring operable to resist the locking mechanism from connecting with the locking arm; wherein the spring is operable to force the locking mechanism away from the locking arm when the locking mechanism is disconnected from the locking arm.

23. The container of claim 8, wherein the container further includes a lid configured to cover the internal area; and further wherein when the lid is seated upon the peripheral wall of the container and the handle body is in the storage position, the lid is positioned between the internal area and the portion of the handle body that extends above the internal area.

24. The container of claim 23, wherein when the handle body is in the storage position, the handle body retains the lid on the peripheral wall of the container.

25. The container of claim 24, wherein the lid includes a grip that is configured to receive the portion of the handle body when the handle body is in the storage position.

26. The container of claim 24, wherein the grip resiliently deforms to receive the portion of the handle body when the handle body is in the storage position.

27. The container of claim 24, wherein the grip is formed from a flexible material.

28. The container of claim 8, wherein the handle body is configured to rotate within a plane that is parallel to the base as the handle body rotates between the operating position and the storage position, and wherein the handle body remains pivotally coupled to the mount as the handle body rotates between the operating position and the storage position.

* * * * *